United States Patent [19]
Budin et al.

[11] 3,765,768
[45] Oct. 16, 1973

[54] OPTICAL DEVICE FOR SIMULTANEOUSLY MEASURING THE DISTANCE AND SPEED OF A MOVING OBJECT WITH RESPECT TO A REFERENCE

[75] Inventors: Jean-Pierre Budin, Paris; Georges Roger, Saint-Michel-sur-Orge, both of France

[73] Assignee: Compagnie Generale d'Electricite, Paris, France

[22] Filed: Mar. 11, 1971

[21] Appl. No.: 123,288

[30] Foreign Application Priority Data
Mar. 16, 1970 France .............................. 7009288

[52] U.S. Cl. ........................... 356/28, 356/4, 356/5, 356/83
[51] Int. Cl. ............................................. G01p 3/36
[58] Field of Search .................. 356/28, 4, 5, 106 R, 356/106 RL

[56] References Cited
UNITED STATES PATENTS
3,409,368  11/1968  Fernandez .............................. 356/4
3,360,987  1/1968  Flower et al. ............................ 356/5
3,552,855  1/1971  Crosswy et al. ........................ 356/28
3,055,258  9/1962  Hurvitz .................................. 356/83

Primary Examiner—Benjamin A. Borchelt
Assistant Examiner—S. C. Buczinski
Attorney—Sughrue, Rothwell, Mion, Zinn & Macpeak

[57] ABSTRACT

An optical device making it possible to simultaneously measure the distance and radial speed of a moving object with respect to a fixed reference. The device includes at least one laser generator intended to emit at least one light pulse in the direction of said moving object, means to measure the propagation time of said pulse reflected by said moving object, and means for measuring the "Doppler" frequency of said reflected pulse. These spectral analysis means are made up of an acoustic-optical tank arranged in a parallel and monochromatic light beam.

4 Claims, 3 Drawing Figures

OPTICAL DEVICE FOR SIMULTANEOUSLY MEASURING THE DISTANCE AND SPEED OF A MOVING OBJECT WITH RESPECT TO A REFERENCE

FIELD OF THE INVENTION

This invention relates to an optical device which makes it possible to simultaneously and with great precision measure the distance d and the radial speed v of a moving object with respect to a fixed reference.

SUMMARY OF THE INVENTION

This invention is intended to provide a device for the simultaneous measurement of the distance $d$ and the speed $v$ of a moving object and includes a laser source capable of emitting at least one light pulse at frequency $\gamma_1$ in the direction of said moving object, a system for the detection of a light pulse at frequency $\gamma_2$ due to the reflection of said pulse of frequency $\gamma_1$ from said moving object, $\gamma_2 - \gamma_1$ being proportional to $v$, a means for counting the time $\Delta\tau$ separating the instant of transmission of said pulse with frequency $\gamma_1$ and the instant of detection of said pulse of frequency $\gamma_2$, $d$ being proportional to $\Delta\tau$, a laser source capable of emitting a reference light beam with frequency $\gamma$, optical means for diverting, in a common direction, a portion of said impulse of frequency $\gamma_1$, a portion of said pulse at frequency $\gamma_2$, a portion of said beam at frequency $\gamma$, detection means arranged in said direction and capable of transmitting signals with frequencies $\gamma_1 - \gamma$ and $\gamma_2 - \gamma$, the output of said detection means being connected to the input of a device for the spectral analysis of signals at frequency $\gamma_1 - \gamma$ and $\gamma_2 - \gamma$, composed of an electric transducer connected to an acoustic-optical tank arranged on the path of a light beam.

BRIEF DESCRIPTION OF THE DRAWINGS

Other features and advantages of the invention will appear in the course of the following description with reference to the attached FIGS. given here by way of illustration and without any limitations, where.

DETAILED DESCRIPTION OF THE PREFERRED EMBODIMENTS

Figure 1:
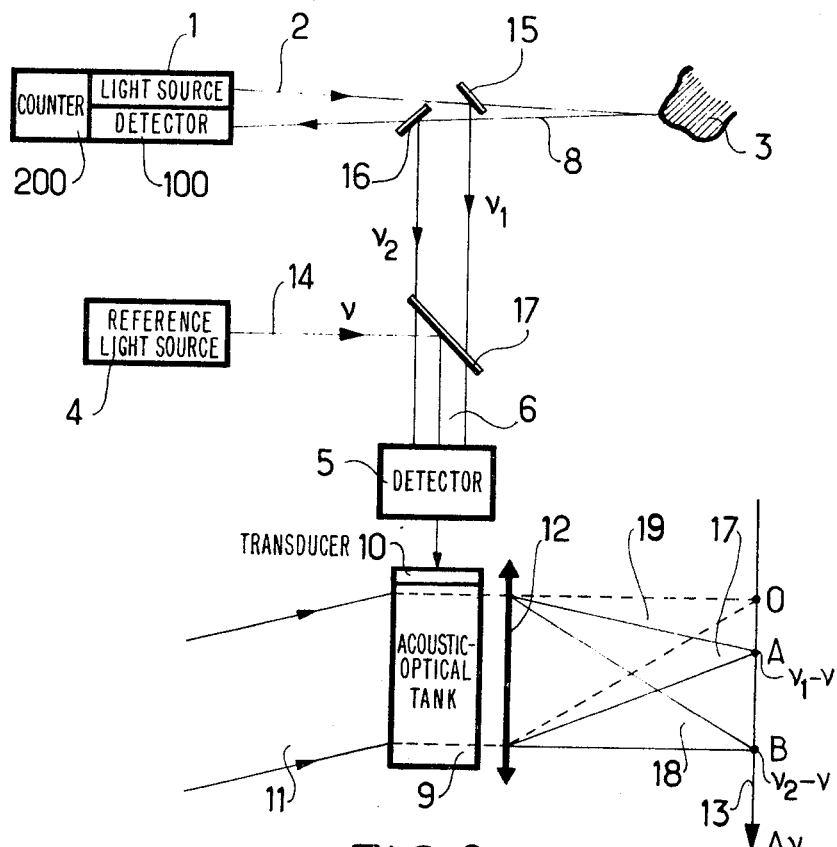
FIG. 1 schematically represents an overall view of a device according to the invention.

FIG. 1 illustrates, schematically, a source 1, preferably a laser generator, transmitting a light pulse with frequency $\gamma_1$ in a direction 2 toward a moving object 3. By way of example, this pulse may have a duration on the order of a few nanoseconds. As a result of the Doppler effect, the pulse eventually reflected by the moving object, 3 is characterized by its frequency $\gamma_2$, such that $\gamma_2 - \gamma_1 = 2\gamma_1 (v/c)$, $c$ being the speed of light and $v$ being the radial speed of the moving object.

The device according to the invention furthermore involves a detection means 100 for the pulse reflected by moving object 3, a counting means 200 for counting the time interval $\Delta\tau$ separating the transmission of the pulse at frquency $\gamma_1$ and the reception, by detector 100, of the pulse at frequency $\gamma_2$.

The device according to the invention also involves a reference source 4, which transmits a light beam 14 whose frequency $\gamma$ is stabilized at least during the maximum duration of intervals $\Delta\tau$: this source is preferably a laser generator.

From optical means 15, 16 and 17, which may be semitransparent plates, there comes, respectively, in a common direction 6, a portion of the incident pulse of frequency $\gamma_1$, a portion of the pulse of frequency $\gamma_2$ reflected by moving object 3, and a portion of the beam 14 of frequency $\gamma$. molybdate. Tank A detector 5 is placed in the path 6 and is capable of transmitting, at its output, a signal at frequency $\gamma_1 - \gamma$, followed by a signal at frequency $\gamma_2 - \gamma$. The output of detector 5 is connected to a spectral analysis system, made up of an electric transducer 10 connected to the output of the detector 5 and to the input of an acoustic-optical tank 9 filled, for example, with a liquid or a crystal, such as lead molybdate. Tank 9, which is transparent to light, is placed in a light beam 11, which can come from a laser generator, and is followed by an optical system, such as a lens 12 in whose focus one can put a screen 13 or the sensitive surface of a light detector.

Beam 11 may be parallel and can be arranged perpendicularly to the tank 9. However, it is preferably inclined by an angle $\phi$ with respect to the tank 9, $\phi$ being essentially equal to half the Bragg angle defined by $\phi = \lambda f/V$ where $\lambda$ is the wave length of the beam 11, V is the propagation speed — in the vat — of the ultrasonic waves transmitted by the tranducer 10, and $f$ is the average frequency of the signal coming out of the detector 5.

The device according to the invention operates in the following manner:

In the initial state, no signal is transmitted to the transducer and the beam 11 is focused at 19 at the zero point of screen 13.

A light impulse is transmitted by source 1 in the direction of moving object 3 which is in motion.

The tank receives a signal at frequency $\gamma_1 - \gamma$ which deflects the beam 11 and transforms it into a beam 17 which is focused at A upon screen 13. The light impact will be visible at A throughout the entire duration of the propagation of the signal at frequency $\gamma_1 - \gamma$ in the tank, for example, a few dozen microseconds.

The moving object 3 reflects the incident pulse. A portion of this pulse is received by detector 100, followed by the counting means 200 which measures the distance d of the moving object 3.

Another portion of the pulse with frequency $\gamma_2$ is detected by detector 5; the tank 9 then deflects the beam 11 and we get a beam 18 which is focused at B on screen 13.

The distance separating the impacts A and B is directly proportional to the frequency difference $\gamma_2 - \gamma_1$, that is to say, to the radial speed v of the target: in effect, $\gamma_2 - \gamma_1 = 2\gamma_1 \; x \; (v/c)$, c being the speed of light.

The device according to the invention thus makes it possible to measure, with a single pulse, the position and speed of a moving object. The relative positions of points A and B with respect to point 0 make it possible without any ambiguity to define the direction of movement of target with respect to the measurement device if we select $\gamma$ and $\gamma_1$ in such a way that $|\gamma_1 - \gamma|$ will always be greater than $|\gamma_1 - \gamma_2|$.

The use of lasers emitting beams with very high frequencies make it possible to determine the differences $\gamma_2 - \gamma_1$ with great precision because these differences are proportional to the frequency $\gamma_1$.

Figure 3:
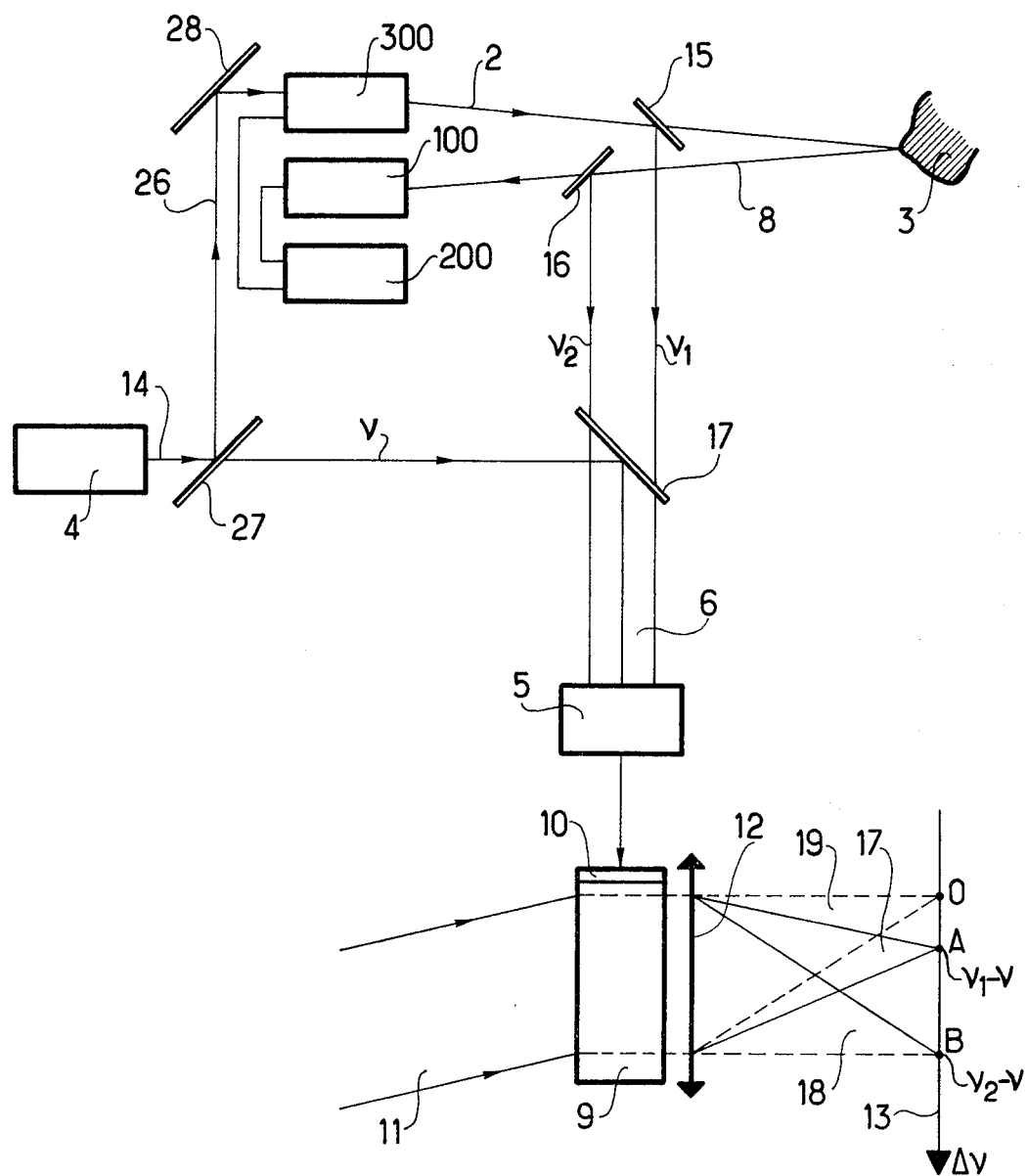
FIG. 3 schematically represents an overall view of a second embodiment of the device according to the invention.

FIG. 3 shows another embodiment of the device according to the invention, wherein the light pulse generator 1 (FIG. 1) is made up of a fraction 26 emitted by the continuous laser 4 in the path in which there is arranged a light modulator 300 as, for example, an electro-optical cell. The beam 26 is taken from the beam 14 by way of elements 27 and 28.

Figure 2:
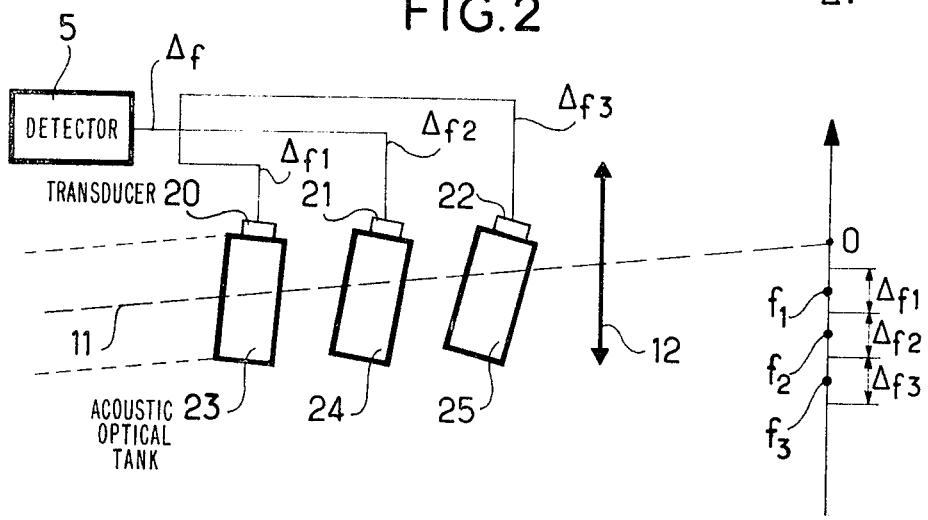
FIG. 2 schematically represents a partial view of one variation of the device according to the invention.

FIG. 2 shows another variation of the device according to the invention, used in the case where the pass band of the electrical transducer 10 limits the frequency band $\Delta f$ of the signals coming from the detector 5, that is to say, the interval of measurable speeds $v$. The output of detector 5 can be connected to several transducers, for eaxample, 20, 21, 22, having respectively, pass bands $\Delta f_1$, $\Delta f_2$, $\Delta f_3$, such that $\Delta f = \Delta f_1 + \Delta f_2 + \Delta f_3$, and centered respectively upon the frequencies $f_1, f_2, f_3$.

Acoustic-optical tanks arranged in beam 11 are respectively excited by the transducers 20, 21, 22 and are inclined upon this beam by an angle $\phi_1$, $\phi_2$, $\phi_3$; $\phi_1$, $\phi_2$, $\phi_3$ are preferably the half-angles of Bragg relative to the frequencies $f_1, f_2, f_3$.

By way of example, only one signal, whose frequency is included in the band $\Delta f_1$ introduces a deviation of the beam 11 by tank 23. The beam emerging from the tank 23 undergoes a translation movement but no deviation upon passing through tanks 24 and 25.

The number of transducers connected to the detector 5 can be any.

It is of course understood that the invention is by no means confined to the manner of implementation described and shown here which was given only by way of example. In particular, without going beyond the framework of the invention, one can make detailed modifications and change certain means for equivalent means.

What is claimed is:

1. Device for the simultaneous measurement of the distance d and the radial speed $v$ of a moving object, comprsing a laser source capable of transmitting at least one light pulse with frequency $\gamma_1$ in the direction of said moving object, detector means for detecting a light pulse reflected from said moving object at freqnecy $\gamma_2$, the freqeuency $\gamma a$ $1- \gamma_2$ being proportional to $v$, means for counting the time $\Delta t$ separating the instant of transmission of said pulse at frequency $\gamma_1$ and the instant of detection of said pulse at frequency $\gamma_2$, $d$ being proportional to $\Delta t$, a laser source for transmitting a reference light beam at frequency $\gamma$, optical means for diverting, in a common direction, a portion of said pulse at frequency $\gamma_1$, a portion of said pulse at frequency $\gamma_2$, and a portion of the beam at frequency $\gamma$, detection means, arranged in said common direction, for transmitting signals at freqency $\gamma_1 - \gamma$ and $\gamma_2 - \gamma$, the output of said detection means being connected to the input of a device for the spectral analysis of signals at frequency $\gamma_1 - \gamma$ and $\gamma_2 - \gamma$, said device for the spectral analysis comprising a transducer, an acoustic-optical tank and means for illuminating said tank with a light beam.

2. Device according to claim 1, wherein said source capable of transmitting at least one light pulse, includes a light modulator positioned in a path to receive a portion of said beam at frequency $\gamma$.

3. Device according to claim 1, wherein said light beam illuminating said tank is inclined with respect to the said tank by an angle equal one half of the Bragg angle relative to the average frequency transmitted by said transducer.

4. Device according to claim 1, further including a plurality of transducers with different pass bands, and a plurality of acoustic-optical tanks, each of said transducers being connected to an acoustic-optical tank arranged in the path of said beam, each of said tanks being inclined upon said light beam by an angle equal to one half the Bragg angle relative to the central frequency of the pass band of the transducer which is associated with it.

* * * * *